United States Patent
Inaba

[19]

[11] Patent Number: 6,144,809

[45] Date of Patent: *Nov. 7, 2000

[54] STEREOSCOPIC CAMERA

[76] Inventor: Minoru Inaba, No. 1116, Oaza Samukawa, Oyama-shi, Tochigi-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/766,575

[22] Filed: Dec. 12, 1996

Related U.S. Application Data

[63] Continuation of application No. 08/444,438, May 19, 1995, abandoned.

[30] Foreign Application Priority Data

Oct. 18, 1994 [JP] Japan ................................. 6-252229

[51] Int. Cl.[7] ................................................. G03B 35/00
[52] U.S. Cl. ........................................ 396/326; 396/329
[58] Field of Search .................................. 354/114, 294; 396/324, 326, 327, 329

[56] References Cited

U.S. PATENT DOCUMENTS

| | | | |
|---|---|---|---|
| 1,596,835 | 8/1926 | Hewson | 396/326 |
| 1,871,281 | 8/1932 | Savage | 396/326 |
| 2,458,466 | 1/1949 | Campbell | 95/18 |
| 2,729,153 | 1/1956 | Heidecke | 354/114 |
| 2,803,179 | 8/1957 | Donaldson | 95/18 |
| 3,068,772 | 12/1962 | MacNeille | 95/44 |
| 3,115,816 | 12/1963 | Muller | 95/18 |
| 3,608,458 | 9/1971 | Ratliff, Jr. | 95/18 |
| 3,687,031 | 8/1972 | Jahnsman | 95/11 |
| 3,852,787 | 12/1974 | Nims et al. | 354/114 |
| 3,953,869 | 4/1976 | Wah Lo et al. | 354/115 |
| 3,967,300 | 6/1976 | Oshima | 354/288 |
| 4,040,071 | 8/1977 | Shane | 354/113 |
| 4,249,798 | 2/1981 | Moskovich | 350/423 |
| 4,418,993 | 12/1983 | Lipton | 352/57 |
| 4,462,025 | 7/1984 | Murakami et al. | 340/743 |
| 4,597,659 | 7/1986 | Suda et al. | 354/409 |
| 4,712,900 | 12/1987 | Hamano et al. | 354/400 |
| 4,879,596 | 11/1989 | Miura et al. | 358/88 |
| 5,504,547 | 4/1996 | Mizukawa | 354/114 |
| 5,548,362 | 8/1996 | Wah Lo et al. | 354/114 |

FOREIGN PATENT DOCUMENTS

| | | | |
|---|---|---|---|
| 3415982 | 10/1985 | Germany | 354/294 |
| 234599 | 2/1945 | Switzerland | 354/114 |

*Primary Examiner*—Russell Adams
*Assistant Examiner*—Christopher E. Mahoney
*Attorney, Agent, or Firm*—Fattibene & Fattibene; Arthur T. Fattibene; Paul A. Fattibene

[57] ABSTRACT

A stereoscopic camera for stereoscopic photography, which reduces losses in the screen when taking a picture in a close range and provides optimum stereoscopic effect without the need of adjusting the distance between the slides that are being mounted. A camera body is furnished with reflex finders constituted by a pair of right and left photographing lenses and pentaprisms. The distance between optical axes of the photographing lenses is adjusted by a horizontal shifting mechanism. Focusing plates of the right and left finders are marked with vertical lines at the centers and on the right and left sides thereof. The distance between optical axes is adjusted depending upon the distance to the subject and vertical lines of the right and left focusing plates are brought into agreement. Then, the right and left photographing areas are nearly brought into agreement on the real screen and no loss occurs on the screen.

14 Claims, 13 Drawing Sheets

STEREOSCOPIC CAMERA

This application is a continuation of application Ser. No. 08/444,438, filed May 19, 1995, now abandoned.

BACKGROUND OF THE INVENTION

The present invention relates to a stereoscopic camera and, particularly, to a stereoscopic camera equipped with a parallax correction function.

DESCRIPTION OF THE PRIOR ART

A stereoscopic camera simultaneously takes two pieces of a picture using two photographing lenses that are spaced apart in the right-and-left direction. A set of two pieces of slides in which a picture is taken using a reversal film are fitted on a stereo slide mount, and a viewer enjoys watching a solid picture using a stereo slide viewer.

Two photographing lenses of the stereoscopic camera are so mounted that the optical axes thereof are in parallel, and parallax takes place on the two pieces of slides 1L and 1R on which a picture is taken simultaneously as shown in FIG. 12 due to a distance between the optical axes of the two photographic lenses. As shown in FIG. 12, furthermore, the two pieces of slides 1L and 1R are fitted on a stereo slide mount 2, and the slide of the left side is viewed by the left eye and the slide of the right side is viewed by the right eye simultaneously using a stereo slide viewer to enjoy a solid image. As the distance is shortened between the subject A and the stereoscopic camera, however, the overlapping portions 3a decrease in the photographing areas of the right and left slides as shown in FIG. 13. When the slides are fitted to the stereo slide mount having windows with open areas which are nearly equal to the screen areas of the slides, edges of windows of the slide mount 2 appear to be overlapped on the non-overlapping portions 3b as the areas non-overlapping portions 3b increase causing an offense to the eye.

It has therefore been attempted to conceal the non-overlapping portions 3b by narrowing the width of windows of the stereo slide mount and use stereo slide mounts having different window widths depending upon a distant view and a close-range view. Therefore, many kinds of stereo slide mounts are necessary having different window widths depending upon the distant view and the close-range view and, particularly, loss increases in the photographing areas in the case of the close-range view. Moreover, parallax varies depending upon a positional relationship of the right and left slides that are mounted, resulting in a change in the solid effect, which makes it very difficult to determine the positions for mounting the slides.

A stereoscopic camera has further been proposed in a literature according to which a focus adjusting mechanism of photographing lenses is interlocked to an interoptical distance adjusting mechanism of the photographing lenses in order to remove the above-mentioned defects. According to this stereoscopic camera, the two photographing lenses are brought close to each other as the focal point of the photographing lenses are moved toward the close-range side, whereby the distance between the optical axes decreases and non-overlapping portions on the screens are suppressed from developing irrespective of the distance to the subject.

A stereoscopic camera equipped with an interoptical distance adjusting mechanism interlocked to a focal point adjusting mechanism, is capable of automatically adjusting the distance between the optical axes irrespective of the photographing distance and makes it possible to reduce loss in the stereoscopic photographing areas. However, the following inconvenience arises since optimum interoptical distance is not obtained with respect to subjects other than the one on which a focal point is set. That is, the interoptical distance affects little in photographing a scenery at infinite distance. As the range of the subject becomes close, however, the effect of interoptical distance increases. Therefore, when stereo slides which contain subjects of distant views and close-range views photographed by using the stereoscopic camera, are viewed using the stereo slide viewer, the subject of the close range appears protruding forward beyond the screen and the non-overlapping portions of the right and left slides appear to be overlapped on the edges of the windows of the slide mount as described earlier.

In mounting the slides on the stereo slide mount, furthermore, it may be only a person who has taken the picture who can judge whether the main subject exists in the distant view or in the close-range view. When the mount is brought to the developing laboratory, therefore, the distance for mounting the pair of right and left slides may not be often that of a desired distance and satisfactory stereo effect will not be obtained.

It therefore becomes necessary to solve the technical problem to make it possible for the photographer to adjust the interoptical distance of the photographing lenses at the time of photographing, to confirm the effect in advance, to obtain an optimum stereoscopic effect obviating the need of adjusting the distance between slides by simply mounting the slides on the stereo slide mount at predetermined positions relative to the windows, and to enhance operation efficiency and quality by uniformalizing the mounting operation. The object of the present invention is to solve the above-mentioned problem.

SUMMARY OF THE INVENTION

In order to accomplish the above-mentioned object, the present invention provides a stereoscopic camera having two photographing lenses mounted in parallel in a camera body, wherein two systems of reflex finders are arranged in the camera body maintaining a distance nearly equal to the distance between human eyes so that image incident on the two photographing lenses can be viewed by two eyes, the two photographing lenses are, respectively, provided with a horizontal shifting mechanism to adjust the distance between the optical axes of the two photographing lenses, and marks of the same shape are formed at the same positions on the focusing plates of the two systems of reflex finders. The invention further provides a stereoscopic camera in which marks of the focusing plates are made up of a plurality of vertical lines.

The stereoscopic camera of the present invention has a structure in which the photographing lens and the reflex finder of a single-lens reflex camera are arranged in two systems, and the right and left finders are arranged maintaining a distance nearly equal to the distance between human eyes. When viewed through the right and left finders, an image incident on the two photographing lens can be viewed as a solid image. The two photographing lenses can be shifted, respectively, using the horizontal shifting mechanism. By adjusting the distance between the optical axes of the two photographing lenses, visual fields of the two photographing lenses are brought into agreement depending upon the photographing distance, and the effect of adjusting the distance between the optical axes can be confirmed through the finders. That is, by shifting the photographing lenses, positions of the subject in the finders move in the horizontal direction. When the positions of the subject with respect to the marks of the same shape at the same positions of the right and left focusing plates, become nearly equal in the right and left screens, marks on the right and left focusing plates appear to be in agreement. When a difference in the positions increases, the right and left marks appear being deviated from each other. By taking a picture with the right and left marks being brought into agreement, the photographing areas of the right and left photographing lenses are nearly brought into agreement. When the photographed slides are watched using the stereo slide viewer, therefore, no window frame appears overlapped on the right and left ends of the screen. Thus, stereoscopic slides having good stereoscopic effect can be obtained.

BRIEF DESCRIPTION OF THE DRAWINGS

FIG. 5 is a diagram of finders of the stereoscopic camera of when viewed by two eyes, wherein FIG. 5(a) illustrates a case where the distance between the optical axes is suitably adjusted, and FIG. 5(b) illustrates a case where the distance is not suitably adjusted;

FIG. 8 is a diagram of focusing plates of FIG. 7 of when viewed by two eyes, wherein FIG. 8(a) illustrates a case where the distance between the optical axes is suitably adjusted, and FIG. 8(b) illustrates a case where the distance is not suitably adjusted;

FIG. 10 is a diagram of focusing plates of FIG. 9 of when viewed by two eyes, wherein FIG. 10(a) illustrates a case where the distance between the optical axes is suitably adjusted, and FIG. 10(b) illustrates a case where the distance is not suitably adjusted;

DESCRIPTION OF PREFERRED EMBODIMENTS

Figure 1:
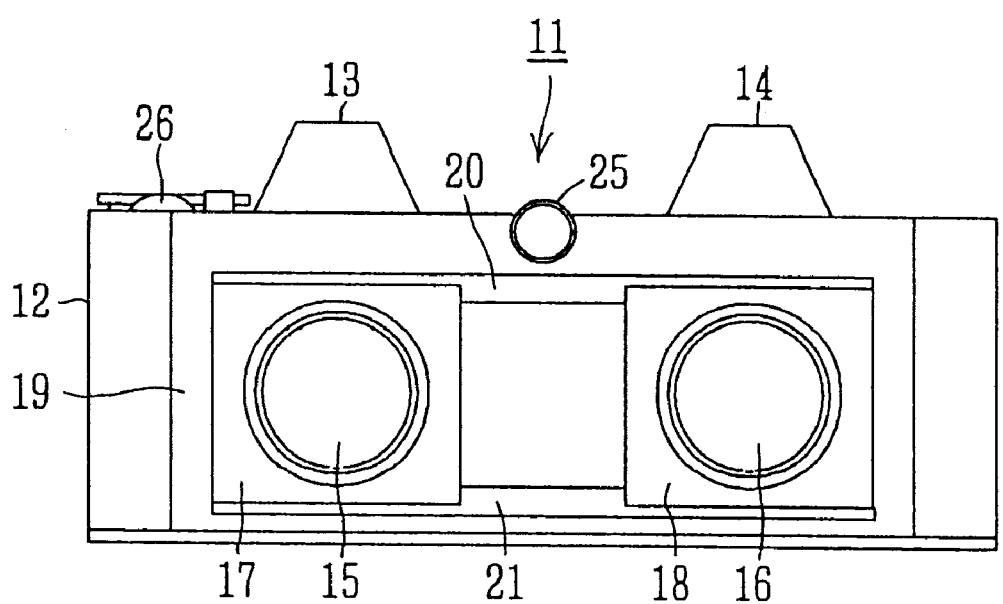
FIG. 1 is a front view of a stereoscopic camera according to an embodiment of the present invention.
Figure 2:
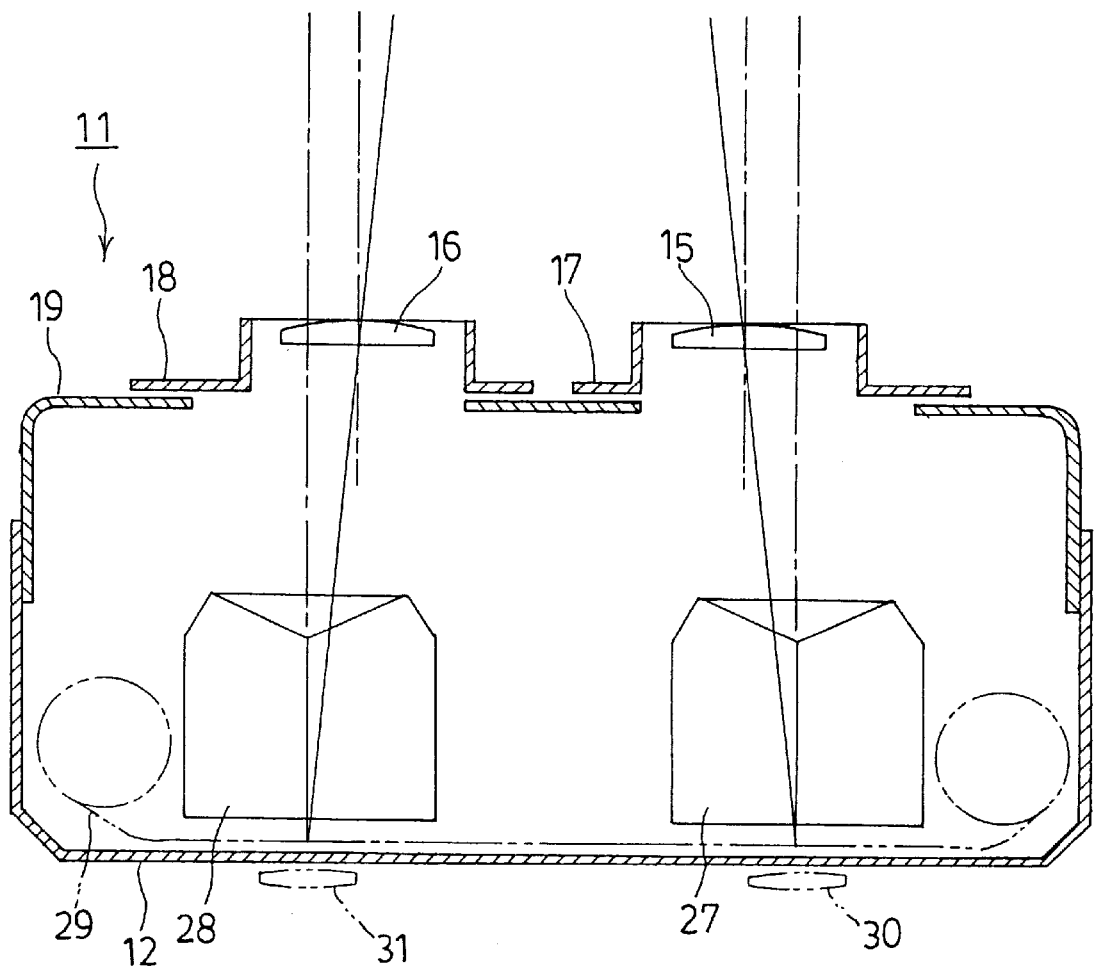
FIG. 2 is a diagram illustrating the constitution of the stereoscopic camera shown in FIG. 1.
Figure 3:
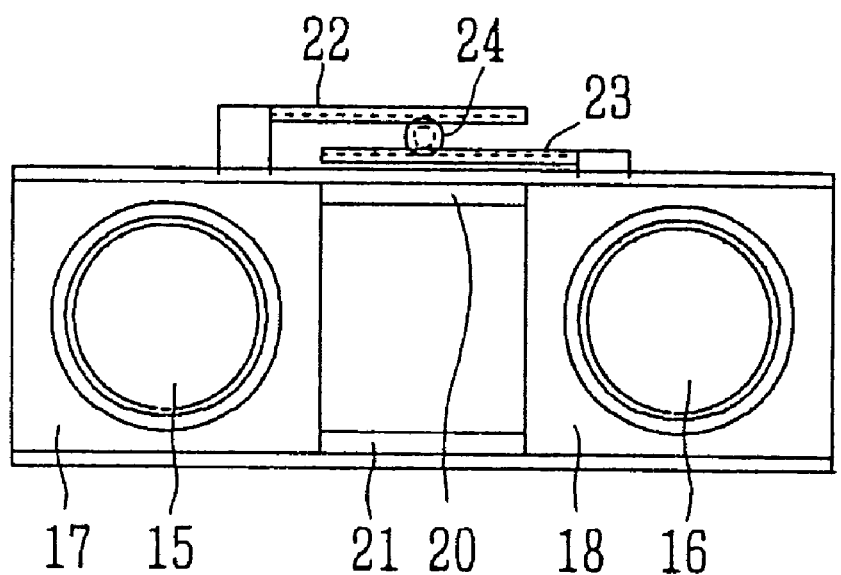
FIG. 3 is a diagram illustrating a horizontal shifting mechanism in the stereoscopic camera.

An embodiment of the present invention will now be described in detail with reference to the drawings 1 to 11. FIGS. 1 and 2 illustrate a stereoscopic camera 11 which has two reflex finders 13, 14 and two photographing lenses 15, 16 that are assembled in a camera body 12 just in a structure in which two single-lens reflex cameras are coupled together in parallel. The photographing lenses 15 and 16 are mounted on lens mount plates 17 and 18. Referring to FIG. 3, the lens mount plates 17 and 18 are engaged with guide rails 20 and 21 that are arranged in the right-and-left direction in a front slide frame 19 of the stereoscopic camera 11. Racks 22 and 23 are provided at upper portions of the lens mount plates 17 and 18 in parallel with the guide rails 20 and 21, and toothed surfaces of the two racks 22 and 23 are facing each other. A pinion gear 24 supported by the front slide frame 19 is arranged between the two racks 22 and 23 and is in mesh with the upper and lower racks 22 and 23. When a lens shift dial 25 attached to the front surface of the pinion gear 24 as shown in FIG. 1 is turned by a finger, the two photographing lenses 15 and 16 are caused to approach or separate away from each other, and the distance between the optical axes of the photographing lenses 15 and 16 is freely adjusted.

Referring to FIG. 2, the front slide frame 19 is incorporated in the camera body 12 so as to slide back and forth. By turning the focal point adjusting dial 26 shown in FIG. 1, the focal point is moved back and forth via a focal point adjusting mechanism (not shown) and is adjusted. In FIG. 2, reference numerals 27 and 28 denote pentaprisms, and 29 denotes a photographic film.

An image incident on the photographing lenses 15 and 16 is focused on the focusing plates that will be mentioned later via quick return mirrors (not shown) disposed under the pentaprisms 27 and 28, and an erect image inverted upside down and rightside left through pentaprisms 27 and 28 can be observed through right and left eyepieces 30 and 31.

Referring to FIG. 2, the horizontal shifting ranges of the photographing lenses 15 and 16 are determined in a direction in which the two photographing lenses 15 and 16 approach each other from the positions where optical axes of the photographing lenses 15 and 16 are in agreement with centers of images on the film in the right-and-left direction, and maximum shifted positions are designed depending upon the shortest photographing distance of the photographing lenses 15 and 16.

Figure 4:
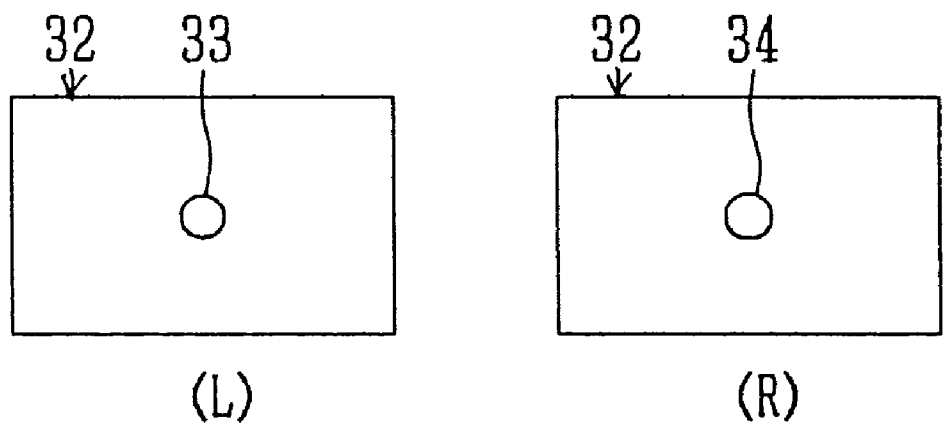
FIG. 4 is a front view of focusing plates.

Referring to FIG. 4, the focusing plates 32 and 32 are marked with circles 33 and 34 at the central positions thereof. By maintaining a maximum distance between the optical axes, i.e., with the shifting amount being set to zero, the stereoscopic camera 11 is faced to an infinity or to a plain wall. In this case, if the right and left finders are viewed by both eyes, parallaxes of the right and left circular marks 33 and 34 are in agreement; i.e., the circular marks 33 and 34 of the right and left focusing plates 32 and 32 appear to be in agreement as shown in FIG. 5(a).

Figure 5:
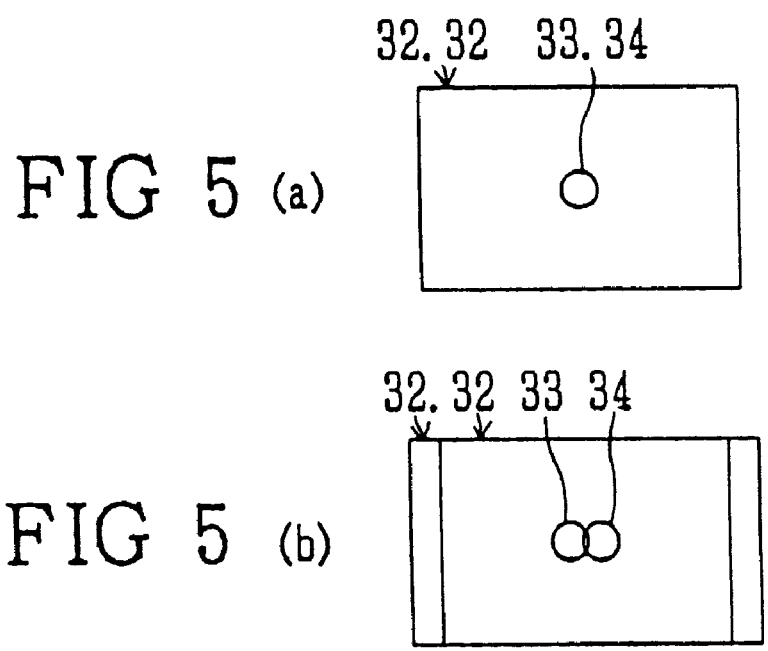
Figure 6:
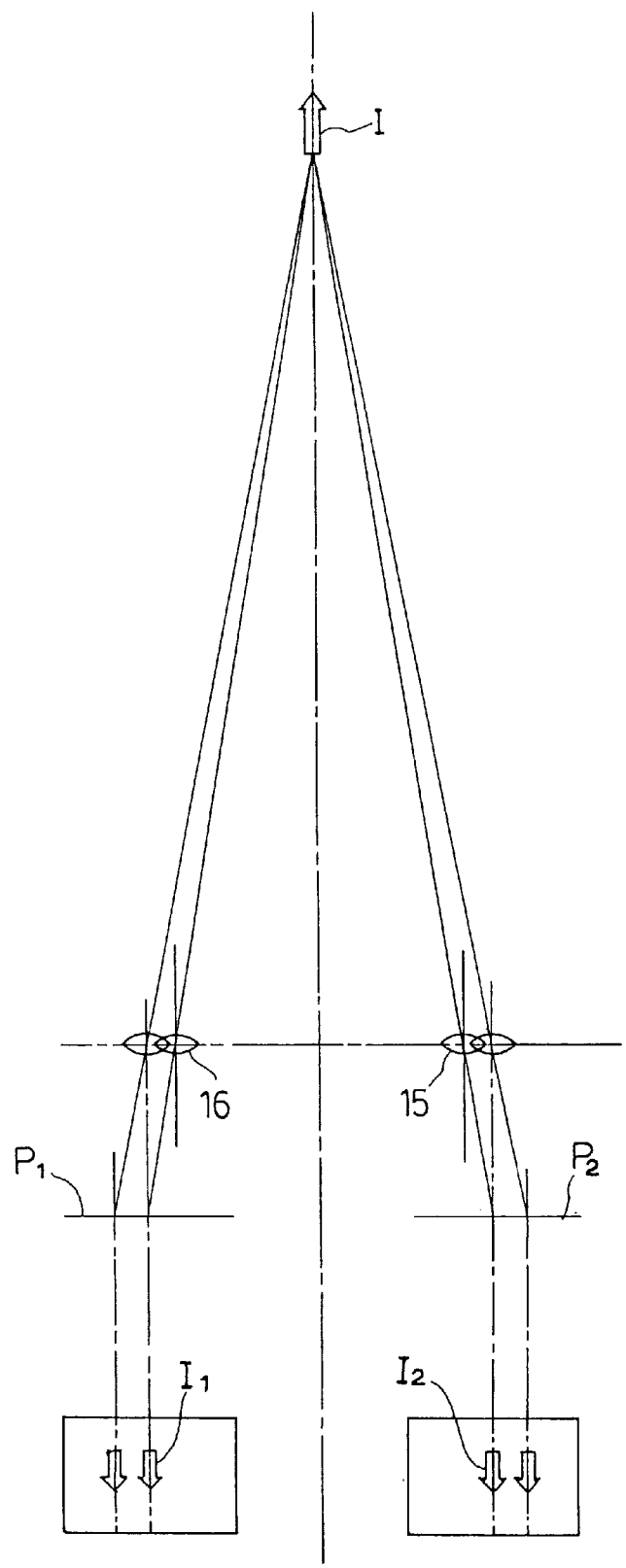
FIG. 6 is a diagram illustrating the shifting of image by adjusting the distance between the optical axes.

In a composition in which a subject is placed in a close-range view, on the other hand, the positional relationship between the subject and the circular marks 33, 34 differs depending upon the right and left focusing plates 32, 32, and the circular marks 33 and 34 appear in double circles which are out of agreement as shown in FIG. 5(b) due to collimation action of a person who gives attention to the subject. In this case, if the lens shift dial 25 is turned to shorten the distance between the optical axes of the photographing lenses 15 and 16, the subject images $I_1$ and $I_2$ move in a direction to approach each other on the right and left focusing planes P1 and P2 as shown in FIG. 6. Therefore, the erect finder images inverted upside down and rightside left through the pentaprisms 27 and 28 move in a direction to separate away from each other contrary to that of FIG. 6. Therefore, parallaxes are corrected relative to circular marks 33 and 34 of the right and left focusing plates 32 and 32, and circular marks 33 and 34 appear to be in agreement or coincident as shown in FIG. 5(a). If a picture is taken in this state, the visual fields of the right and left lenses 15 and 16 become nearly in agreement with each other at a distance to the subject.

When the thus photographed stereo slides are fitted to the stereo slide mount, the non-overlapping portions need not be concealed since photographing areas of the right and left slides are nearly in agreement. Accordingly, there can be used a stereo slide mount having windows of a size nearly the same as the practical screen size, and screen loss can be minimized. In mounting the slides on the stereo slide mount, furthermore, the slides are mounted at reference positions where centers of windows of the stereo slide mount in the right-and-left direction are in agreement with the centers of the slides in the right-and-left direction, whereby the stereo effect confirmed through the finders at the time of photographing is obtained and the positions for mounting the slides need not be adjusted depending upon the photographing distance to the subject.

Figure 7:
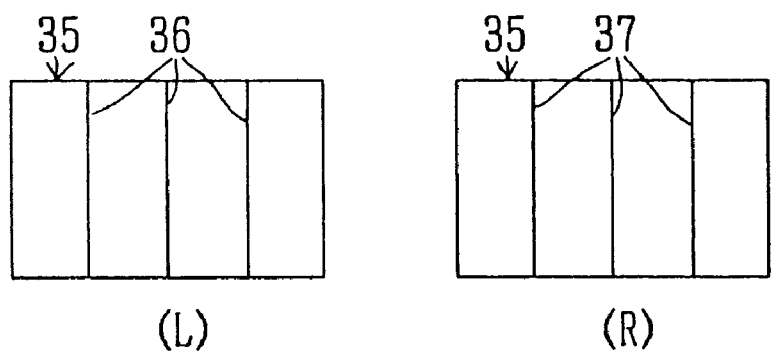
FIG. 7 is a front view of focusing plates of the stereoscopic camera according to claim 2.
Figure 8:
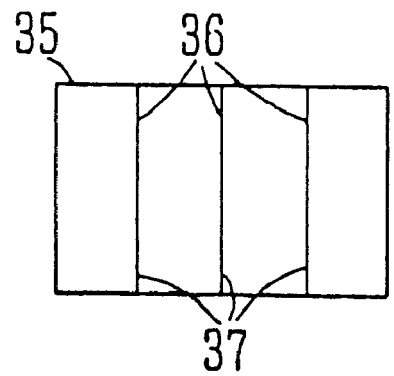
Figure 8:
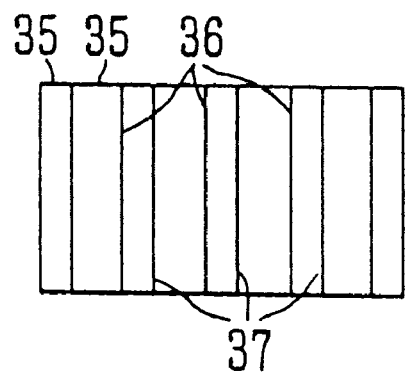

FIG. 7 illustrates right and left focusing plates 35 and 35 of the stereoscopic camera according to claim 2, each of which being marked with three vertical lines 36, 36, 36, 37, 37, 37 at a center and on the right and left sides thereof. When the finders of this stereoscopic camera is viewed by two eyes and when the distance between the optical axes is not suitably adjusted with respect to the distance to the subject, vertical lines 36, 37 of the right and left focusing plates 35, 35 appear to be deviated as shown in FIG. 8(b). In this case, the distance between the optical axes is adjusted like in the above-mentioned stereoscopic camera, so that the vertical lines 36, 37 of the right and left focusing plates 35, 35 are brought into agreement as shown in FIG. 8(a). Here, since the vertical lines 36, 37 are disposed at the centers and on the right and left sides thereof, relative positions between the vertical lines 36, 37 and the image distance of stereoscopic image of the subject can be confirmed irrespective of the position of the image of subject on the screen, and the adjustment of distance between the optical axes can be confirmed.

In adjusting the distance between the optical axes, it can be confirmed that the position of the subject moves back and forth relative to the marks or vertical lines depending upon the shifting amount within a lens shifting range in which the circular marks 33, 34 or vertical lines 36, 37 of the right and left focusing plates come into agreement. In a range in which the right and left marks are in agreement, good stereoscopic effect is obtained irrespective of the shifting amount. Except the case of obtaining a special effect such as the one in which the subject in a close range protrudes forward beyond the screen, the distance between the optical axes should be so adjusted that the whole scene appears to be at a distance beyond the circular marks 33, 34 or vertical lines 36, 37, so that stereoscopic slides having natural stereoscopic effect are obtained without permitting the solid image of a subject in a close range to be focused at a close distance when the stereo slides are watched using the stereo slide viewer.

Figure 9:
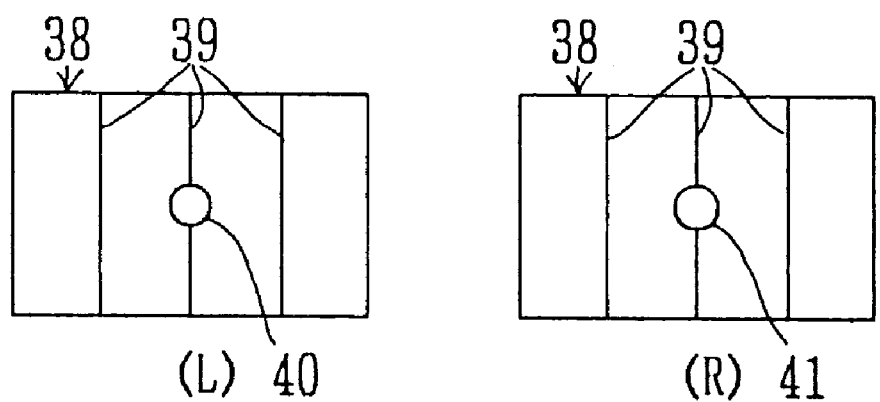
FIG. 9 is a front view illustrating focusing plates according to a further embodiment.
Figure 10:
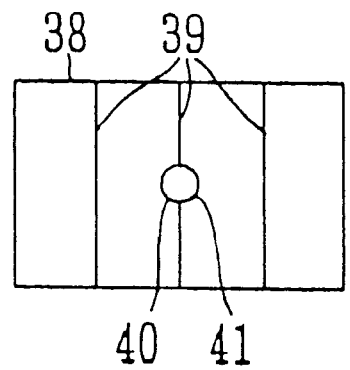
Figure 10:
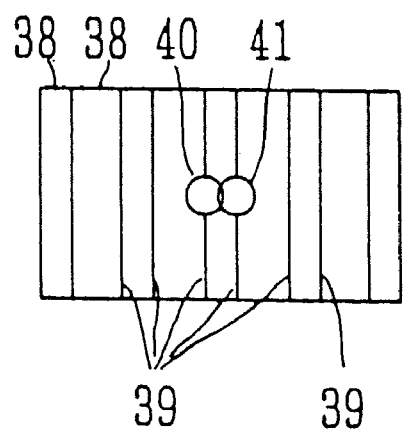

FIG. 9 illustrates a further embodiment in which the focusing plates 38, 38 are marked with three vertical lines 39, 39, 39, and circular marks 40, 41 are added to the central vertical lines 39 at a center in the up-and-down direction thereof. When the distance between the optical axes is adjusted by using the focusing plates 35 having vertical lines only shown in FIGS. 7 and 8 and by operating the lens shift dial 25, it may be often difficult to judge whether the vertical lines 36, 37 to be brought into agreement are moving in a direction to come into agreement or in a direction to separate away from each other. The focusing plates 38 shown in FIG. 9, however, make it easy to judge the shifting direction since the circular marks 40 and 41 move to approach, or separate away from, each other as shown in FIG. 10(b). FIG. 10(a) shows a finder image of when the distance is proper between the optical axes.

Figure 11:
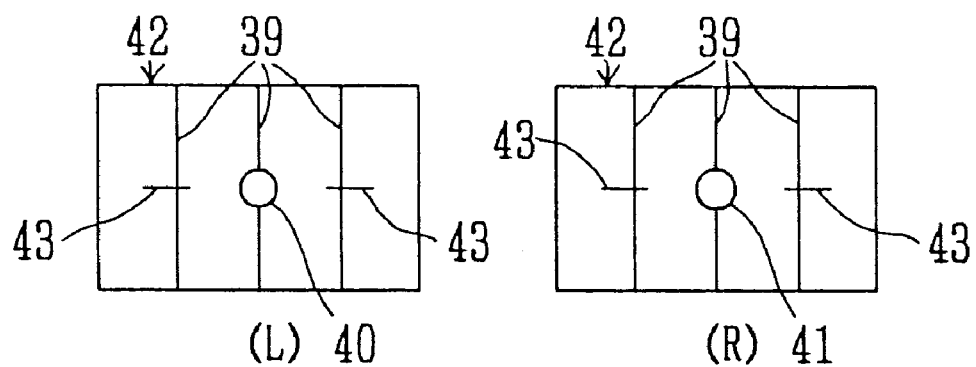
FIG. 11 is a front view illustrating focusing plates according to a further embodiment.
Figure 12:
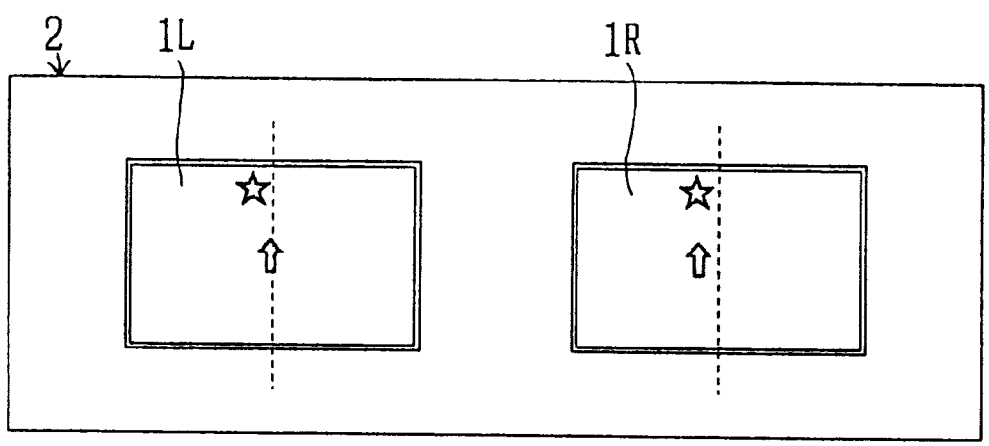
FIG. 12 is a front view of a stereo slide mount.
Figure 13:
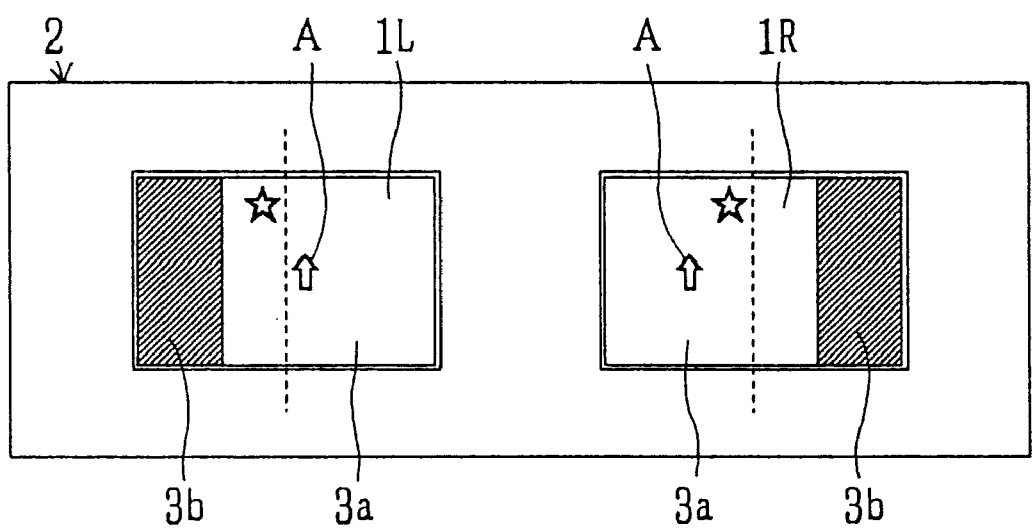
FIG. 13 is a diagram illustrating losses of screens in a conventional stereoscopic photograph.

FIG. 11 illustrates a still further embodiment wherein the focusing plates 42, 42 have lateral lines 43 at the centers in the up-and-down direction of the right and left vertical lines 39, 39 of the focusing plates 38 shown in FIG. 9, making it easy to confirm parallelism with respect to the horizon or the subject.

The present invention is not limited to the above-mentioned embodiments only. For instance, the mechanism for shifting the photographing lenses may be constituted by feed screws including a right hand screw and a left hand screw. Moreover, the number of vertical lines of the focusing plates 35 needs not be limited to three but may be changed in a variety of ways without departing from the scope of the invention.

According to the present invention as described above in detail by way of the embodiments, the distance between optical axes of the pair of photographing lenses of the stereoscopic camera is arbitrarily changed to meet the distance of the subject, whereby the parallax of the subject is adjusted, the photographing areas of the right and left screens are brought into agreement, and the effect is confirmed through the finders. Therefore, there is no need of using stereo slide mounts having windows of various widths for concealing non-overlapping portions of the right and left slides that become a hindrance in watching the stereo slides using the stereo slide viewer. It is therefore allowed to obtain stereoscopic slides without loss in the screen areas.

In mounting the slides on the stereo slide mount, furthermore, there is no need to adjust the positions of the right and left slides with respect to windows of the stereo slide mount, and stereoscopic effect confirmed through the finders at the time of taking a picture is obtained by simply mounting the slides on reference positions, and the mounting operation can be facilitated.

What is claimed is:

1. A stereoscopic camera having two photographing lenses mounted in parallel in a camera body, wherein two systems of reflex finders are arranged in the camera body maintaining a distance substantially equal to the distance between human eyes so that an image incident on the two photographing lenses can be viewed by two eyes, the two photographing lenses are, respectively, provided with a horizontal shifting mechanism to adjust the distance between the optical axes of the two photographing lenses, and marks of the same shape are formed at the same positions on each focusing plate of the two systems of reflex finders wherein the marks on each of the focusing plates and the image projected onto the right and left focusing plates through two photographic lenses are three dimensionally viewed simultaneously and the distance between the optical axes of the two photographic lenses are adjusted independently of the two systems of reflex finders which remain stationary while viewing the marks, causing the marks to overlap and the positional relationship between the marks and the images in the direction of distance as three dimensionally viewed in order to take a picture upon judging the quality of the stereoscopic image based upon the positional relationship between the marks and the image and the direction of distance.

2. A stereoscopic camera according to claim 1, wherein marks of the focusing plates are made up of a plurality of vertical lines.

3. A stereoscopic camera having two photographing lenses mounted in parallel in a camera body, wherein two systems of reflex finders are arranged in the camera body maintaining a distance so that an image incident on the two photographing lenses can be viewed by two eyes, the two photographing lenses are, respectively, provided with a horizontal shifting mechanism to adjust the distance between the optical axes of the two photographing lenses independent of the two systems of reflex finders which remain stationary, and a pair of focusing plates having marks of the same shape and formed at the same relative positions on the pair of focusing plates of the two systems of reflex finders, whereby adjusting the horizontal shifting mechanism brings the marks on each of the pair of focusing plates into agreement from the perspective of a viewer in order to achieve a stereoscopic effect.

4. A stereoscopic camera comprising:

a first photographing lens having a first optical axis;

a second photographing lens having a second optical axis, said first and second photographing lenses separated by a distance;

a horizontal shifting mechanism connected to said first and second photographing lenses, said horizontal shifting mechanism capable of adjusting the distance between said first and second optical axis;

a first focusing plate associated with said first photographing lens, said first focusing plate having first marks thereon; and a second focusing plate associated with said second photographing lens, said second focusing plate having second marks thereon, said first and second focusing plates remaining stationary relative to each other, whereby said first and second photographing lenses move independently of said first and second focusing plates, whereby said horizontal shifting mechanism is adjusted to align the first and second marks thereby bringing into agreement image fields of said first and second photographic lenses.

5. A stereoscopic camera as in claim 4 wherein:
said first and second marks are circles.

6. A stereoscopic camera as in claim 4 wherein:
said first and second marks are a plurality of lines.

7. A stereoscopic camera as in claim 4 wherein:
said first and second marks are the same.

8. A stereoscopic camera as in claim 4 wherein:
said first and second marks are formed from lines and circles.

9. A method of aligning image fields in a stereoscopic camera comprising the steps of:

viewing an erect image through a first and second photographic lenses of an object at a photographic distance;

focusing the first and second photographic lenses to form the erect image of the object at the photographic distance;

placing a first focusing plate having first marks thereon between the first photographic lens and a first eye of a viewer;

placing a second focusing plate having second marks thereon between the second photographic lens and a second eye of a viewer; and adjusting a distance between the first and second photographic lenses while the first and second focusing plates remain stationary relative to each other such that the first and second marks appear to the viewer to be in agreement, whereby a stereoscopic effect is obtained such that when a stereoscopic slide of the object taken with the stereoscopic camera is watched using a stereo slide viewer no window frame appears overlapped on right and left ends of a screen.

10. A stereoscopic camera comprising:

a single camera body;

a first lens mount plate;

a second lens mount plate, said first lens mount plate and said second lens mount plate slidably mounted on said single camera body;

a guide rail engaging said first and second lens mount plates;

a first photographing lens mounted in said first lens mount plate;

a second photographing lens mounted in said second lens mount plate;

a first rack having a toothed surface connected to said first lens mount plate and positioned parallel to said guide rail;

a second rack having a toothed surface connected to said second lens mount plate and positioned parallel to said guide rail;

a pinion gear placed between said first and second rack engaging the toothed surfaces;

a lens shift dial attached to said pinion gear, whereby when said lens shift dial is turned the first and second photographic lenses are caused to approach or separate away from each other;

a first focusing plate having a plurality of vertical lines thereon positioned to receive an image from said first photographing lens;

a second focusing plate having a plurality of vertical lines thereon in the same position as the plurality of vertical lines on said first focusing plate positioned to receive an image from said second photographing lens, said first focusing plate and said second focusing plate remaining stationary relative to each other, whereby movement of said first and second photographing lenses does not result in movement of said first and second focusing plates;

a first pentaprism positioned to receive the image from said first focusing plate;

a second pentaprism positioned to receive the image from said second focusing plate;

a first eyepiece positioned to receive the image from said first pentaprism; and a second eyepiece positioned to receive the image from said second pentaprism, whereby upon viewing the image through said first and second eyepieces said lens shift dial is adjusted to bring the plurality of vertical lines on each of said first and second focusing plates into agreement from the perspective of a viewer resulting in a stereoscopic slide having good stereoscopic effect such that when the stereoscopic slide is watched using a stereo slide viewer no window frame appears overlapped on right and left ends of a screen.

11. A method of aligning image fields in a stereoscopic camera so that screen loss can be minimized when mounting a stereoscopic slide, comprising the steps of:

viewing an erect image through a first photographic lens and first pentaprism and a second photographic lens and second pentaprism contained in a single camera body, said first photographic lens and said second photographic lens being separated by a distance;

focusing on a subject to be photographed;

placing a first focusing plate having first marks thereon between the first photographic lens and pentaprism and a first eye of a viewer, such that the viewer sees the first marks superimposed over a first image;

placing a second focusing plate having second marks thereon between the second photographic lens and pentaprism and a second eye of a viewer, such that the viewer sees the second marks superimposed over a second image, the first marks being identical to the second marks; and adjusting the distance between the first and second photographic lenses while the first and second focusing plates remain stationary relative to each other such that the first and second marks appear to the viewer to be in agreement depending upon a photographing distance to the subject, whereby a stereoscopic effect is obtained such that when a stereoscopic slide taken with the stereoscopic camera is watched using a stereo slide viewer no window frame appears overlapped on right and left ends of a screen thereby minimizing screen loss.

12. A method of exposing a film used in a stereoscopic camera for forming a stereoscopic slide comprising the steps of:

selecting an object to be imaged;

focusing a pair of photographic lenses each forming an image of the object;

viewing the image of the object through the pair of photographic lenses, a pair of viewfinders, and a pair of focus plates, each focus plate having an identical mark and viewed through one of the pair of photographic lenses and one of the pair of viewfinders;

adjusting the distance between the pair of photographic lenses while maintaining focus of the object and holding the pair of focus plates stationary relative to each other so that the identical marks are aligned;

exposing the film; and mounting the film to form a stereoscopic elide, whereby the stereoscopic slide is mounted without overlapping.

13. A stereoscopic camera comprising:

a single body;

a first photographic lens having a first optical axis attached to said single body;

a second photographic lens having a second optical axis attached to said single body and placed adjacent said first photographic lens;

a shifting mechanism coupled to said first and second photographic lenses, whereby the distance between the first and second optical axes is selectively changed;

a first reflex finder placed within said single body;

a second reflex finder placed within said single body adjacent said first reflex finder, said first and second reflex finders fixed in position a distance apart;

a first focus plate viewable through said first reflex finder, said first focus plate having a first mark thereon; and a second focus plate viewable through said second reflex finder, said second focus plate having a second mark thereon, the second mark being identical to the first mark, wherein the distance between the first and second axis of said first and second photographic lenses is selectively changed independent of a distance between said first and second focus plates which remain stationary relative to each other, whereby adjusting the horizontal shifting mechanism to bring the first and second marks into agreement during viewing of an object achieves a stereoscopic effect without overlapping images.

14. A stereoscopic camera as in claim 13 wherein:

the first and second marks are vertical lines.

* * * * *